United States Patent
Rempel et al.

(10) Patent No.: US 7,385,010 B2
(45) Date of Patent: Jun. 10, 2008

(54) HYDROGENATION OF DIENE-BASED POLYMER LATEX

(75) Inventors: Garry Llewellyn Rempel, Waterloo (CA); Qinmin Pan, Waterloo (CA); Jialong Wu, Kitchener (CA)

(73) Assignee: LANXESS Inc., Sarnia, Ontario (CA)

( * ) Notice: Subject to any disclaimer, the term of this patent is extended or adjusted under 35 U.S.C. 154(b) by 0 days.

(21) Appl. No.: 11/371,674

(22) Filed: Mar. 9, 2006

(65) Prior Publication Data

US 2006/0211827 A1   Sep. 21, 2006

Related U.S. Application Data

(60) Provisional application No. 60/663,025, filed on Mar. 18, 2005.

(30) Foreign Application Priority Data

Mar. 18, 2005   (CA) .................................. 2501203

(51) Int. Cl.
*C08C 19/02* (2006.01)
*C08F 8/04* (2006.01)

(52) U.S. Cl. ............... 525/338; 525/360; 525/340; 525/328.3; 525/329.3; 525/332.8; 525/333.1; 525/333.2

(58) Field of Classification Search ............... 525/338, 525/360, 340, 328.3, 329.3, 332.8, 333.1, 525/333.2
See application file for complete search history.

(56) References Cited

U.S. PATENT DOCUMENTS

| | | | | |
|---|---|---|---|---|
| 3,454,644 A | * | 7/1969 | Dewhirst | 564/385 |
| 3,480,659 A | * | 11/1969 | Dewhirst | 558/467 |
| 3,700,637 A | * | 10/1972 | Finch, Jr. | 525/329.3 |
| 4,464,515 A | * | 8/1984 | Rempel et al. | 525/338 |
| 4,631,315 A | | 12/1986 | Buding et al. | 525/338 |
| 5,057,581 A | | 10/1991 | Rempel et al. | 525/338 |
| 5,272,202 A | | 12/1993 | Kubo et al. | 524/565 |
| 5,705,571 A | | 1/1998 | Tsiang et al. | 525/338 |
| 6,020,439 A | | 2/2000 | Ko et al. | 525/338 |
| 6,410,657 B1 | | 6/2002 | Ko et al. | 525/338 |
| 6,521,694 B2 | | 2/2003 | Belt et al. | 524/503 |
| 6,552,132 B2 | | 4/2003 | Belt et al. | 525/338 |
| 6,696,518 B1 | * | 2/2004 | Dersch et al. | 524/560 |

FOREIGN PATENT DOCUMENTS

| | | | |
|---|---|---|---|
| GB | 1 558 491 | * | 1/1980 |
| GB | 2 070 023 | * | 9/1981 |
| JP | 2001-288212 | * | 10/2001 |
| WO | 00/73357 | | 12/2000 |

OTHER PUBLICATIONS

Singha et al., Polymer Sci., 1, 181-185 (1994).*
Guo and Rempel in Journal of Molecular Catalysis (v 63, n 3, Dec. 15, 1990, p. 279-298) Catalytic hydrogenation of diene polymers Part I. Kinetic analysis and mechanistic studies on the hydrogenation of polybutadiene polymers in the presence of $RhCl(PPh_3)_3$.
Guo and Rempel in Journal of Molecular Catalysis (v 72, n 2 Mar. 1, 1992, p. 193-208) Catalytic hydrogenation of diene polymers Part II. Kinetic analysis and mechanistic studies on the hyddrogenation of styrene-butadiene copolymers in the presence of $RhCl(PPh_3)_3$.
Mao and Rempel in Journal of Molecular Catalysis, A: Chemical, (v 135, n 2, Oct. 14, 1998, p. 121-132) "Catalytic hydrogenation of nitrile-butadiene copolymers by cationic rhodium complexes".
Charmondusit et al, in Journal of Applied Polymer Science (v 89, n 1, Jul. 5, 2003, p. 142-152) "Hydrogenation of cis-1,4-Poly(isoprene) Catalyzed by $OsHCl(CO)(O_2)(PCy_3)_2$".
Parent, McManus and Rempel in Industrial & Engineering Chemistry Research, (v 37, n 11, Nov. 1998, p. 4253-4261) "$OsHCl(CO)(O_2)(PCy_3)_2$-Catalyzed Hydrogenation of Acrylonitrile-Butadiene Copolymers".
Parent, McManus, and Rempel in Industrial & Engineering Chemistry Research (v 35 n 12, Dec. 1996, p. 4417-4423) $RhCl(PPh_3)_3$ and $RhH(PPh_3)_4$ Catalyzed Hydrogenation of Acrylonitrile-Butadiene copolymers.
Pan and Rempel in Macromolecular Rapid Communications (v 25, Apr. 2004, p. 843-847) "Hydro-genation of Styrene-Butadiene Rubber Catalyzed by $Ru(CH=CHPh)Cl(CO)(PCy_3)_2$".
Guo and Rempel in Journal of Applied Polymer Science (v 65, n 4, Jul. 25, 1997, p. 667-675) "Catalytic Hydrogenation of Nitrile-Butadiene Copolymer Emulsion".
Mudalige and Rempel in J. Molecular Catalysis (123, 15-20, 1997) Aqueous-phase hydrogenation Of polybutadiene, styrene-butadiene, and nitrile-butadiene polymer emulsions catalyzed by water-soluble rhodium complexes.
Zhang, et al in Hecheng Xiangjiao Gongye, China Synthetic Rubber Industry (2003, 26(2), 78-80.

(Continued)

*Primary Examiner*—Ling-Siu Choi
(74) *Attorney, Agent, or Firm*—Jennifer R. Seng

(57) ABSTRACT

The present invention relates to a process for the hydrogenation of the carbon-carbon double bonds in diene based polymer latex.

13 Claims, No Drawings

OTHER PUBLICATIONS

Wei in Gullin Gongxueyuan Xuebao (1999, 9(1), 66-69).

Singha, et al in Polym. Sci. (194), 1, 181-5) "Catalytic Hydrogenation of Nitrile Rubber Latex Using Water Soluble Wilkinson Catalyst".

Sokolov et al in Proizvodstvo I Ispol'zovanie elastomerov (1992, (12), 4-8).

Kotzabasakis V et al: "Catalytic conversions in aqueous media: a novel and efficient hydrogenation of polybutadiene-1,4-block-poly-(ethylene oxide) catalyzed by Rh/TPPTS complexes in mixed micellar nanoreactors" Journal of Molecular Catalysis. A, Chemical, Elsevier, Amsterdam, NL. vol. 231, No. 1-2, Apr. 20, 2005, pp. 93-101, XP004775162 ISSN: 1381-1169 the whole document.

Wei, Wu, Pan, Rempel: "Direct Catalytic Hydrogenation of an Acrylonitrile-Butadiene Rubber Latex Using Wilkinson's Catalyst" Macromolecular Rapid Communications, No. 26, Oct. 2005, pp. 1768-1772, XP002379641 Weinhelm the whole document.

* cited by examiner

HYDROGENATION OF DIENE-BASED POLYMER LATEX

This Application claims the benefit of U.S. Provisional Application Ser. No. 60/663,025 filed on Mar. 18, 2005 and Canadian patent Ser. No. 2,501,203.

FIELD OF THE INVENTION

The present invention relates to a process for the hydrogenation of the carbon-carbon double bonds in diene based polymers.

BACKGROUND OF THE INVENTION

It has been known that carbon-carbon double bonds in polymers may be successfully hydrogenated by treating the polymer in an organic solution with hydrogen in the presence of a catalyst. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, osmium and ruthenium. The suitability of the catalyst depends on the extent of hydrogenation required, the rate of the hydrogenation reaction and the presence or absence of other groups, such as carboxyl and nitrile groups, in the polymers.

U.S. Pat. No. 6,410,657 teaches a method for the selective hydrogenation of the unsaturated double bonds in conjugated diene units of a homopolymer or copolymer in the presence of a homogeneous organotitanium-based catalyst. It demonstrates a high degree of hydrogenation and hydrogenation reproducibility using a catalyst mixture consisting of a substituted or unsubstituted monocyclopentadienyl titanium compound and lithium hydride derived from a reaction of both alkyl lithium and hydrogen in solution.

U.S. Pat. No. 6,020,439 demonstrates a method for hydrogenating living polymers that include mainly conjugated double bond monomers and aromatic vinyl monomers. The polymer made by at least one conjugated diene compound is contacted with hydrogen in the presence of a catalyst. The catalyst is formed from a cyclopentadienyl titanium compound. A cocatalyst is provided in the form of alkoxylithium compound. This catalyst system selectively hydrogenates the unsaturated double bonds in the conjugated diene units of the living polymer in solution.

U.S. Pat. No. 5,705,571 provides a process for selective hydrogenation of a conjugated diene polymer. The process includes bringing the conjugated diene polymer in an inert organic solvent into contact with hydrogen in the presence of a hydrogenation catalyst combination including a substituted or unsubstituted bis(cyclopentadienyl) Group VIII transition metal compound and an organic lithium compound. It claims that the hydrogenation can be carried out in the presence of a small amount of the hydrogenation catalyst combination under mild conditions, and both the hydrogenation conversion and selectivity to conjugated diene units are high.

U.S. Pat. No. 5,057,581 teaches a selective hydrogenation method of the carbon-carbon double bonds of conjugated diene copolymers in homogeneous solution in an organic solvent in the presence of certain divalent ruthenium carbonyl complex catalysts containing phosphine ligands having bulky alkyl substituents.

U.S. Pat. No. 3,454,644 teaches the hydrogenation in solution of unsaturated organic compounds having from 2 to 20 carbon atoms which organic compounds contain at least one moiety selected from keto, formyl, nitrile, nonaromatic carbon double bonds and carbon-carbon triple bonds, by using as the catalyst a metal complex of ruthenium or osmium bonded to two electro negative species selected from hydrogen and halogen and complexed with at least two organic stabilizing ligands such as carbonyl or tertiary phosphine.

Guo and Rempel in Journal of Molecular Catalysis (v 63, n 3, Dec. 15, 1990, p 279-298; v 72, n 2, Mar. 1, 1992, p 193-208) describe the hydrogenation of poly cis-1,4-polybutadiene and styrene-butadiene copolymer in the presence of $RhCl(PPh_3)_3$ in solution under mild reaction conditions. Quantitative hydrogenation of carbon-carbon unsaturation can be achieved without any large scale changes in polymer chain length properties.

Mao, and Rempel in Journal of Molecular Catalysis, A: Chemical, (v 135, n 2, Oct. 14, 1998, p 121-132) teaches hydrogenation of nitrile-butadiene copolymers catalyzed in monochlorobenzene by a series of cationic rhodium complexes $[Rh(diene)(L_2)]^+$ (diene =norbornadiene (NBD) and 1,5-cyclooctadiene (COD); $L_2=(PPh_3)_2$, $Ph_2P(CH_2)_nPPh_2$ (n=2, 3 and 4); $Cy_2P(CH_2)_2PCy_2$).

Charmondusit et al, in Journal of Applied Polymer Science (v 89, n 1, Jul. 5, 2003, p 142-152) describes quantitative homogeneous hydrogenation of cis-1,4-poly-(isoprene) (CPIP) in the presence of $OsHCl(CO)(O_2)(PCy_3)_2$ as catalyst over the temperature range of 115-140° C. in solution.

Parent, McManus, and Rempel in Industrial & Engineering Chemistry Research, (v 37, n 11, November 1998, p 4253-4261) describes the selective hydrogenation of olefin within acrylonitrile-butadiene copolymers by homogeneous catalyst precursor, $OsHCl(CO)(L)(PCy_3)_2$ (1, L=vacant; 2, $L=O_2$) in solution. Reversible coordination of nitrile to complex 1 not only reduces the hydrogenation rate but creates an unprecedented sensitivity of the process to pressure. Unique to this system is an apparent second-order dependence of the hydrogenation rate on $[H_2]$, which diminishes toward zero order as pressures exceed 60 bar.

Parent, McManus, and Rempel, in Industrial & Engineering Chemistry Research (v 35, n 12, December 1996, p 4417-4423) describes homogeneous catalyst precursors of the forms $RhCl(PPh_3)_3$ and $RhH(PPh_3)_4$ for the selective hydrogenation of acrylonitrile-butadiene copolymers in solution. The kinetic results suggest the behavior observed under severe conditions is consistent with that reported for pressures and temperatures near ambient. Dilute solution viscosity data are used to demonstrate the uniform selectivity of both $RhCl(PPh_3)_3$ and $RhH(PPh_3)_4$ catalyzed hydrogenations.

Pan and Rempel in Macromolecular Rapid Communications (v 25, April, 2004, p 843-847) describe an efficient hydrogenation of butadiene-styrene copolymers in solution using a ruthenium complex.

In summary, the research in this area, the hydrogenation of diene-based polymers has been very successful if the polymers were dissolved in an organic solvent.

However, many diene-based polymers/copolymers are made by emulsion polymerization processes and they are in latex form when they are discharged from polymerization reactors. Therefore it is very desirable to invent a process in which the diene-based polymer latex can be hydrogenated directly. Direct hydrogenation of polymer latex is receiving increasing attention in the recent decade. Many efforts have been made to realize such a process as discussed below.

U.S. Pat. No. 6,552,132 claims a process for the hydrogenation of a polymer composed of diene monomer units and nitrile group containing monomer units, in which the hydrogenation in the form of an aqueous dispersion in the presence of hydrazine and an oxidizing compound.

U.S. Pat. No. 6,521,694 describes a process for hydrogenating carbon-carbon double bonds of an unsaturated polymer in the form of an aqueous dispersion by adding to the unsaturated polymer (1) a reducing agent selected from the group comprising hydrazines and hydrazine-releasing compounds, (2) an oxidizing compound and (3) a catalyst, wherein the catalyst contains an element from group 13 of the Periodic Table of the Elements.

U.S. Pat. No. 5,272,202 describes a process for the selective hydrogenation of the carbon-carbon double bonds of an unsaturated, nitrile-group-containing polymer with hydrogen in the presence of a hydrogenation catalyst. An aqueous emulsion of the unsaturated, nitrile-group-containing polymer is involved. Optionally, an organic solvent capable of dissolving or swelling the polymer is caused to exist at a volume ratio of the aqueous emulsion to the organic solvent in a range of from 1:3 to 1:0. A palladium compound is used as the hydrogenation catalyst. The aqueous emulsion is brought into contact with gaseous or dissolved hydrogen while maintaining an emulsified state.

JP 02178305 describes a process for the hydrogenation of nitrile rubber by contacting the emulsions and optionally swelling the emulsions in organic solvents with hydrogen in the presence of Pd compounds. Thus, a 100 mL 10 percent nitrile rubber emulsion (containing 39.4 percent units derived from acrylonitrile) was mixed with 63.3 mg palladium benzoate in 50 mL benzene, and heated at 50° C. under 30 atm of hydrogen pressure for 6 hours to give a 90.2 percent hydrogenated emulsion.

JP 2001288212 describes a process for hydrogenated diene-based polymer latexes. Latexes of 2-chloro-1,3-butadiene (co)polymers were mixed with solutions or dispersions of catalysts in organic solvents which dissolve or swell the (co)polymers, and then contacted with hydrogen. Thus, a latex of poly(2-chloro-1,3-butadiene) rubber (Tg −42° C. and Mn 150,000) was added to a toluene solution containing $RhCl(PPh_3)_3$ and $Ph_3P$, and hydrogenated at 100° C. and 5.0 MPa for 2 hours to give a hydrogenated polymer with Tg −54° C. and Mn 120,000.

DE 19924340 teaches a process for selective hydrogenation of nonaromatic C=C and C≡C bonds in polymers with hydrogen in the presence of Rh or Ru complexes or salts as catalysts and a nonionic P compound, such as $PR_3$ or $R_2P(O)xZ(O)yPR_2$ [R=C1-10 alkyl, C4-12 cycloalkyl, C1-10 alkoxy, aryl(oxy), F, etc.; Z=bivalent hydrocarbon residue; x, y=0, 1]. The hydrogenation is carried out in aqueous dispersions instead of in an organic medium. Aqueous dispersions containing hydrogenated polymers and their use for coatings were also claimed. Thus, an acrylic acid-butadiene-styrene copolymer latex was prepared by radical polymerization of a mixture of monomers containing also $Ru(acac)_3$. $Bu_3P$ which was added to the latex. The system was stirred for 16 h at ambient temperature followed by hydrogenation at 150° C. and 280 bar to give a dispersion which was used to formulate a pigmented outdoor paint and a silicate-containing paint.

Guo and Rempel in Journal of Applied Polymer Science (v 65, n 4, Jul. 25, 1997, p 667-675) describes two processes for the selective hydrogenation of the C=C bonds in nitrile-butadiene rubber emulsions in the presence of a number of $RuCl_2(PPh_3)_3$ complex catalysts. Both process can realize quantitative hydrogenation of the C=C, with the help of a certain amount of organic solvent to dissolve or swell the polymers.

Mudalige and Rempel in J. Molecular Catalysis (123, 15-20. 1997) describes aqueous-phase hydrogenation of polybutadiene, styrene-butadiene and nitrile-butadiene polymer emulsions catalyzed by water-soluble rhodium complexes, at 100° C. and 5.5 MPa of hydrogen pressure. The use of some organic solvent is also involved.

Zhang, et al in Hecheng Xiangjiao Gongye (2003, 26(2), 78-80) describes hydrogenation of nitrile rubber latex at ambient pressure by hydrazine hydrate/hydrogen peroxide redox system in the presence of boric acid catalyst. It was claimed that the hydrogenated nitrile latex had a degree of hydrogenation of over 90 percent when boric acid (2.64 mmol), hydrazine hydrate (95.2 mmol), reaction temperature of 60° C., and reaction time 6 hours were employed.

Wei in Guilin Gongxueyuan Xuebao (1999, 9(1), 66-69) describes a process for polyisoprene latex hydrogenation by using hydrazine hydrate and $H_2O_2$ as a redox system. The structural change of polyisoprene in hydrogenation was studied. The hydrogenated polymer from the 1,2-structure was better and the reaction rate was faster than from the 3,4- and 1,4-structures. DSC showed that the Tg of hydrogenated polyisoprene was near to that of ethylene-propylene rubber.

Singha, et al in Polym. Sci. (1994,1, 181-5) describes the use of a water-soluble analog of the Wilkinson catalyst for hydrogenation of nitrile rubber latex. The hydrogenation occurs under mild conditions (1 atm of hydrogen pressure, 75° C.) without coagulation of the latex, and up to 60 percent hydrogenation can be achieved. Gel content in latex increases with increasing catalyst concentration.

Sokolov et al in Proizvodstvo i Ispol'zovanie Elastomerov (1992, (12), 4-8) describes the effects of pH, Cu catalyst type, oxygen concentration and temperature on conversion of double bonds during hydrogenation of nitrile rubber SKN-40ASM latex with hydrazine hydrate. The maximal degree of hydrogenation was achieved at pH 8.3. $CuSO_4.5H_2O$ catalyst was more active than $CuCl_2.xH_2O$. Replacement of air with oxygen in the reaction medium accelerated the process, e.g., by increasing the degree of hydrogenation after 3 h from 39.1 to 58.21 percent. Increasing the temperature from 10 to 60° C. led to a rise in side reactions, notably crosslinking.

In summary for research in this area, there are two major approaches: one approach is similar to conventional solution catalytic hydrogenation, but the polymer is hydrogenated in latex form with the presence of organic solvents instead of homogeneous organic solutions; another approach involves the use of diimide, in which a hydrogen source is generated in situ as a result of redox reactions. At present, both these approaches encounter deficiency to achieve high conversion and eliminate gel formation. The present invention is directed to a process wherein selective hydrogenation of diene-based polymer latex without any use of organic solvent, is achieved efficiently with high degree of hydrogenation and without any gel problem.

SUMMARY OF THE INVENTION

The present invention provides an organic solvent free process for the hydrogenation of carbon-carbon double bonds present in polymers in latex form.

The present invention also provides an organic solvent free process for the hydrogenation of a diene-polymer in latex form or a polymer in latex form containing a conjugated diolefin and at least one other copolymerizable monomer.

The process of the present invention includes hydrogenating a polymer in latex form at a temperature of from about 35° C. to about 180° C. at a hydrogen pressure of from about 0.1 to about 20 MPa in the presence of a catalyst having the formula:

$$RhQL_x$$

wherein Q is hydrogen or an anion, preferably a halide and more preferably a chloride or bromide ion wherein L is a ligand compound of the formula $R_mB$, wherein R is a $C_1$-$C_8$-alkyl group, a $C_4$-$C_8$-cycloalkyl group a $C_6$-$C_{15}$-aryl group or a $C_7$-$C_{15}$-aralkyl group, B is phosphorus, arsenic, sulfur, or a sulphoxide group, and m is 2 or 3, preferably m is 2 when B is sulphur or sulphoxide, and m is 3 when B is phosphorus or arsenic, and wherein x is 2, 3 or 4, preferably x is 3 when Q is halogen and preferably x is 4 when Q is hydrogen.

DETAILED DESCRIPTION OF THE INVENTION

The process of the present invention includes polymers which contain carbon-carbon double bonds in latex form. Polymers having carbon-carbon double bonds useful in the present invention include conjugated diene, homo-polymers or polymers of a conjugated diene and at least one other copolymerizable monomer.

Suitable conjugated dienes include butadiene, isoprene, piperylene and 2,3-dimethylbutadiene, with butadiene and isoprene being preferred and butadiene being most preferred.

Suitable copolymerizable monomers include acrylonitrile, methacrylonitrile, styrene, alphamethyl styrene, propyl acrylate, butyl acrylate, propyl methacrylate, butyl methacrylate, and unsaturated carboxylic acids selected from fumaric acid, maleic acid, acrylic acid and methacrylic acid.

According to the present invention, the conjugated diene forms from about 15 to about 100% by weight of the carbon-carbon double bond containing polymer in the latex form. If other copolymerizable monomers are used and selected from styrene and alphamethyl styrene, the styrene and/or a methyl styrene monomer preferably forms from about 15 to about 60% by weight of the polymer. If other copolymerizable monomers are used and selected from acrylonitrile and/or methacrylonitrile, the acrylonitrile and/or methacrylonitrile monomer preferably forms from about 15 to about 50% by weight of the polymer, with the conjugated diolefin forming from about 50 to about 85% by weight of the polymer.

If other copolymerizable monomers are used and selected from acrylonitrile and methacrylonitrile and additionally from an unsaturated carboxylic acid, the acrylonitrile or methacrylonitrile forms from about 15 to about 50% by weight of the polymer, the unsaturated carboxylic acid forms from about 1 to about 10% by weight of the polymer and the conjugated diolefin forms from about 40 to about 85% by weight of the polymer.

Preferred polymers include styrene-butadiene polymers of the random or block types, butadiene-acrylonitrile polymers and butadiene-acrylonitrile-methacrylic acid polymers. Preferred butadiene-acrylonitrile polymers have an acrylonitrile content of from about 25 to about 45% by weight.

Polymers useful in the process of the present invention are high molecular weight materials and have molecular weights, as expressed by the Mooney viscosity (ML1+4 at 100° C.), of from about 25 to about 70. A polymer having a Mooney viscosity of about 34 has an intrinsic viscosity, determined in chlorobenzene at 35° C., of about 1.1 dL/g.

The carbon-carbon double bond containing polymer in the latex form useful in the present invention may be prepared by any method known to those skilled in the art, such as emulsion polymerization, solution polymerization or bulk polymerization. Preferably, the carbon-carbon double bond containing polymer useful in the present invention is prepared in an aqueous emulsion polymerization process as this process directly yields the latex form of the polymer. Preferably, according to the present invention, the polymer content of the latex may range from 1 to 70 wt. %, more preferably from 5 to 30 wt. % based on the total weight of the latex.

The hydrogenation process of the present invention can be achieved with use of a rhodium containing catalyst. Preferably the catalyst is of the formula:

$$RhQL_x$$

wherein Q is hydrogen or an anion, preferably a halide and more preferably a chloride or bromide ion wherein L is a ligand compound of the formula $R_mB$, wherein R is a $C_1$-$C_8$-alkyl group, a $C_4$-$C_8$-cycloalkyl group a $C_6$-$C_{15}$-aryl group or a $C_7$-$C_{15}$-aralkyl group, B is phosphorus, arsenic, sulfur, or a sulphoxide group, and m is 2 or 3, preferably m is 2 when B is sulphur or sulphoxide, and m is 3 when B is Phosphorus or arsenic, and wherein x is 2, 3 or 4, preferable x is 3 when Q is halogen and preferably x is 4 when Q is hydrogen.

Preferred catalysts include tris-(triphenylphosphine)-rhodium(I)-chloride, tris(triphenylphosphine)-rhodium(III)-chloride and tris-(dimethylsulphoxide)-rhodium(III)-chloride, and tetrakis-(triphenylphosphine)-rhodium hydride, and the corresponding compounds in which triphenylphosphine moieties are replaced by tricyclohexylphosphine moieties. The catalyst can be used in small quantities. An amount in the range of 0.01 to 5.0% preferably 0.02% to 2.0% by weight based on the weight of the polymer solids content of the latex.

The catalyst can be used with a co-catalyst that is a ligand of formula $R_mB$, where R, m and B are as defined above, and m is preferably 3. Preferably B is phosphorus, and the R groups can be the same or different. Thus there can be used a triaryl, trialkyl, tricycloalkyl, diaryl monoalkyl, dialkyl monoaryl diaryl monocycloalkyl, dialkyl monocycloalkyl, dicycloalkyl monoaryl or dicycloalkyl monoaryl co-catalysts. Examples of suitable co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0 to 5000%, more preferably 500 to 3000% by weight, based on the weight of catalyst. Preferably also the weight ratio of the co-catalyst to the rhodium-containing catalyst compound is in the range 0 to 50, more preferably in the range 5 to 30.

The hydrogenation process of the present invention is preferably carried out with essentially pure hydrogen gas at a pressure of from about 0.1 to about 20 MPa, preferably at a pressure of from about 1 to about 16 MPa.

The hydrogenation process of the present invention can be undertaken in a suitable reactor equipped with temperature regulating and agitating means. According to the present invention polymer latex can be fed into the reactor and degassed as required, the catalyst can then be added as a pure material or in some cases as a solution with a small amount of organic solvent and the reactor can then be pressurized with hydrogen or, in the alternative, the reactor can be pressurized with hydrogen and the catalyst added as a pure material or as a solution. Or, according to the present invention, the catalyst can be added as a pure material into reactor, and then the polymer latex can be fed into the reactor and degassed as required.

Generally, according to the present invention, it is preferred to heat the reactor device and the polymer latex before the catalyst is added. The hydrogenation temperature suitable for the present invention is from about 35° C. to about 180° C., preferably from about 80° C. to about 160° C.

During the course of the hydrogenation reaction of the present invention, the hydrogen may be added to the reactor. The reaction time is from about one quarter of an hour to about 100 hours, depending on operational conditions. The extent to which the carbon-carbon double bonds in the polymer can be hydrogenated is from about 80 to about 99.5%, preferably from about 90 to about 99.5%.

When the hydrogenation reaction is complete to the extent desired, the reaction vessel can be cooled and vented. The resultant hydrogenated latex can be used in latex form if required or be coagulated and washed, to obtain the hydrogenated polymer in solid form.

The invention is further illustrated but is not intended to be limited by the following examples in which all parts and percentages are by weight unless otherwise specified.

EXAMPLES

The following examples with the experimental conditions shown in Table 1 illustrate the scope of the invention and are not intended to limit the same.

TABLE 1

Experimental Conditions for Examples of Hydrogenation of Nitrile-Butadiene Rubber in Latex Form

| Example # | Latex (ml) | Water (ml) | MCB (ml) | Catalyst | $W_{cat}$ (g) | $PPh_3$ (g) | $P_{H2}$ psi | T° C. |
|---|---|---|---|---|---|---|---|---|
| 1 | 50 | 100 | 0 | $RhCl(PPh_3)_3$ | 0.0378 | 0.594 | 900 | 145 |
| 2 | 100 | 50 | 0 | $RhCl(PPh_3)_3$ | 0.0698 | 0.695 | 1000 | 145 |
| 3 | 100 | 0 | 0 | $RhCl(PPh_3)_3$ | 0.06 | 0.6 | 1000 | 145 |
| 4 | 50 | 100 | 7 | $RhCl(PPh_3)_3$ | 0.0379 | 0.592 | 1000 | 145 |
| 5 | 100 | 0 | 0 | $RhCl(PPh_3)_3$ | 0.0072 | 0.094 | 1500 | 160 |
| 6 | 100 | 0 | 0 | $RhCl(PPh_3)_3$ | 0.06 | 0.6 | 1000 | 160 |
| 7 | 50 | 100 | 0 | $RhCl(PPh_3)_3$ | 0.0356 | 0 | 1000 | 145 |
| 8 | 100 | 0 | 0 | $RhCl(PPh_3)_3$ | 0.122 | 1.22 | 1000 | 145 |
| 9 | 25 | 75 | 0 | $RhCl(PPh_3)_3$ | 0.031 | 0.31 | 1000 | 145 |
| 10 | 25 | 75 | 0 | $RhCl(PPh_3)_3$ | 0.031 | 0.31 | 1000 | 145 |
| 11 | 25 | 75 | 0 | $RhCl(PPh_3)_3$ | 0.031 | 0.31 | 1000 | 145 |
| 12 | 25 | 75 | 0 | $RhCl(PPh_3)_3$ | 0.031 | 0.31 | 1000 | 145 |
| 13 | 25 | 75 | 0 | $RhCl(PPh_3)_3$ | 0.015 | 0.31 | 1000 | 145 |
| 14 | 50 | 100 | 0 | $OsHCl(CO)(PCy_3)_2O_2$ | 0.0377 | 0 | 900 | 160 |

The materials which were used in the hydrogenation reaction and analysis are listed in Table 2.

TABLE 2

Specification of the Materials

| Material | Supplier |
|---|---|
| Butadiene-acrylonitrile polymer latex (VPKA 8817), solid content 14.3 wt %, containing 62% butadiene | Bayer Inc. |
| $RhCl(PPh_3)_3$ | Synthesized according to literature procedures (Osborn, J. A.; Jardine, F. H.; Young, J. F.; Wilkinson, G., J. Chem. Soc. A. 1966, 1711-1732) |
| Triphenylphosphine (99%) | Strem Chemicals |
| Hydrogen (99.999%) | Praxair |
| Methyl ethyl ketone (99.8%) | Fisher Scientific |
| Monochlorobenzene (laboratory grade) | Fisher Scientific |
| $OsHCl(CO)(PCy_3)_2O_2$ | Synthesized according to literature procedures (Werner, H.; Esteruelas, M. A. Otto, H. Organometallics 1986, 5, 2295) |

Example 1

A 300 ml glass lined stainless steel autoclave having temperature control means, an agitator and hydrogen gas addition points was used. A latex of a butadiene-acrylonitrile polymer which had a bound acrylonitrile content of about 38% by weight and a Mooney viscosity (ML1+4 at 100° C.) of about 29 was used. The solid content in the latex was 14.3% by weight. The mean diameter of the polymer particles in the latex was about 75 nm. 50 ml of such a latex, 100 ml water, 0.0378 gram of the catalyst $RhCl(PPh_3)_3$ and 0.594 gram of $PPh_3$ were charged into the reactor. The latex was then degassed with hydrogen. The temperature was increased to 145° C. and hydrogen pressure was raised up to 900 psi (6.1 MPa). The result is shown in Table 3. After 87 hours, the hydrogenation degree reaches 92%. No gel was generated and the resultant polymer is soluble in methyl ethyl ketone.

Example 2

The same procedures as described in Example 1 were employed. However, 100 ml latex, 50 ml water, 0.0698 grams of catalyst and 0.695 grams of $PPh_3$, were used and 1000 psi (6.8 MPa) of hydrogen pressure, 145° C. was applied. The results are illustrated in Table 3. A 91 % hydrogenation degree was achieved at 93 hours and no gel was generated.

Example 3

The same procedures as described in Example 1 were employed. However, 100 ml latex, no additional water, 0.06 grams of catalyst, and 0.6 grams of PPh$_3$ were used and 1000 psi (6.8 MPa) of hydrogen pressure, 145° C. was applied. The results are illustrated in Table 3. A 94% hydrogenation degree was achieved at 163 hours and no gel was generated.

Example 4

The same procedures as described in Example 1 were employed. However, 50 ml latex, 100 ml water, 0.0379 grams of catalyst which was dissolved in 7 ml monochlorobenzene, and 0.592 grams of PPh$_3$ were used and 1000 psi (6.81 MPa) of hydrogen pressure and 145° C. were applied. The results are illustrated in Table 3. A 95% hydrogenation degree was achieved at 63 hours and no gel was generated.

Example 5

The same procedures as described in Example 1 were employed. However, 100 ml latex, no additional water, 0.0072 grams of catalyst and 0.094 grams of PPh$_3$ were used and 1500 psi of hydrogen pressure and 160° C. were applied. The results are illustrated in Table 3. A 64% hydrogenation degree was achieved at 187 hours and no gel was generated.

Example 6

The same procedures and conditions as described in Example 3 were employed. Except 160° C. was applied. The results are illustrated in Table 3. A 91% hydrogenation degree was achieved at 112 hours and no gel was generated.

Example 7

The same procedures as described in Example 1 were employed. However, 50 ml latex, 100 ml additional water, 0.0356 grams of catalyst and no PPh$_3$ were used and 1000 psi of hydrogen pressure and 145° C. of temperature were applied. A 31% hydrogenation degree was achieved at 36 hours and no gel was generated.

Example 8

The same procedures as described in Example 1 were employed. However, 100 ml latex, no additional water, 0.122 grams of catalyst and 1.22 grams of PPh$_3$ were used and 1000 psi of hydrogen pressure and 145° C. was applied. The results are illustrated in Table 3. A 97.8% hydrogenation degree was achieved at 90 hours and no gel was generated.

Example 9

The same procedures and conditions as described in Example 8 were employed except 25 ml latex, 75 ml water, 0.031 grams of catalyst and 0.31 grams of PPh3 were applied. The results are illustrated in Table 3. A 97.0% hydrogenation degree was achieved at 52 hours and no gel was generated.

Example 10

The same procedures and conditions as described in Example 9 were employed except the system was degassed with nitrogen and hydrogen was introduced 11 hours later after the reaction system was heated to temperature set point. The results are illustrated in Table 3. A 96.3% hydrogenation degree was achieved at 34.5 hours of reaction time and no gel was generated.

Example 11

The same procedures and conditions as described in Example 10 were employed except hydrogen was introduced 21 hours later after the reaction system was heated to temperature set point. A 96.6% hydrogenation degree was achieved at 50 hours of reaction time and no gel was generated.

Example 12

The same procedures and conditions as described in Example 11 were employed except hydrogen was introduced 45 hours later after the reaction system was heated to temperature set point. The results are illustrated in Table 3. A 98.3% hydrogenation degree was achieved at 48.5 hours of reaction time and no gel was generated.

Example 13

The same procedures and conditions as described in Example 12 were employed except 0.015 grams of catalyst was applied, and hydrogen was introduced 23 hours later after the reaction system was heated to temperature set point. The results are illustrated in Table 3. A 93.3% hydrogenation degree was achieved at 72.5 hours of reaction time and no gel was generated.

Example 14 (Comparative)

The same procedures and conditions as described in Example 1 were employed except 0.0377 g OsHCl(CO)(PCy$_3$)$_2$O$_2$ without PPh$_3$ was used as catalyst and 160° C. of temperature was applied. A 22% hydrogenation degree was achieved at 26 hours and gel was generated.

Discussion of Results

In Table 3 a summary of the degree of hydrogenation in the nitrile-butadiene rubber latex as a function of reaction time is provided.

The results clearly show that under a number of operating conditions that it is possible to achieve a degree of hydrogenation in excess of 90 percent. For all examples when the catalyst loading is greater than 0.4 percent higher than 90 percent of hydrogenation degrees was achieved except Example 7 wherein no PPh$_3$ was added. Utilization of higher catalyst loading under otherwise similar operating conditions can greatly shorten reaction time for a given degree of hydrogenation as would be expected. The addition of water to the latex increases catalyst stability and allows for utilization of lower catalyst loadings under otherwise comparable operating conditions.

Dissolution of the catalyst in a small amount of organic solvent (10-15 volume percent of latex), and addition of such solution to the latex followed by hydrogenation under otherwise comparable reaction conditions, shortens the reaction time somewhat for a desired degree of hydrogenation. However, degrees of hydrogenation of greater than 90 percent can be achieved without such organic solvent.

Hydrogenation of the latex in the presence of the RhCl (PPh$_3$)$_3$ catalyst is greatly facilitated by the addition of PPh$_3$.

For latex hydrogenation in the presence of the RhCl (PPh$_3$)$_3$ catalyst system, the integrity of the latex is retained and no gel formation is observed. In the case of the OsHCl (CO)(PCy$_3$)$_2$O$_2$ catalyst system, much lower degrees of hydrogenation are observed and gel formation occurs.

TABLE 3

Results for hydrogenation of nitrile-butadiene rubber latex
(Experimental conditions provided in Table 1)

| 1# | Time hr | 0 | 18 | 23 | 28 | 45 | 48 | 64 | 72 | 87 |
|---|---|---|---|---|---|---|---|---|---|---|
|  | HD % | 0 | 45 | 54 | 64 | 74 | 76 | 84 | 88 | 92 |
| 2# | Time hr | 0 | 5.5 | 20 | 45 | 69 | 93 |  |  |  |
|  | HD % | 0 | 33 | 52 | 70 | 85 | 91 |  |  |  |
| 3# | Time hr | 0 | 18 | 42 | 65 | 90 | 115 | 138 | 163 |  |
|  | HD % | 0 | 48 | 67 | 81 | 89 | 92 | 93 | 94 |  |
| 4# | Time hr | 0 | 4.5 | 19 | 22 | 24 | 28 | 39 | 53 | 63 |
|  | HD % | 0 | 27 | 45 | 65 | 70 | 76 | 86 | 94 | 95 |
| 5# | Time hr | 0 | 15 | 23 | 39 | 71 | 111 | 137 | 163 | 187 |
|  | HD % | 0 | 25 | 32 | 39 | 48 | 59 | 62 | 63 | 64 |
| 6# | Time hr | 0 | 16 | 40 | 75 | 112 |  |  |  |  |
|  | HD % | 0 | 42 | 69 | 85 | 91 |  |  |  |  |
| 7# | Time hr | 0 | 12.5 | 20.5 | 36 |  |  |  |  |  |
|  | HD % | 0 | 11 | 20 | 31 |  |  |  |  |  |
| 8# | Time hr | 0 | 18.5 | 41.5 | 67 | 70 | 90 |  |  |  |
|  | HD % | 0 | 55.4 | 84.4 | 95.2 | 95.5 | 97.8 |  |  |  |
| 9# | Time hr | 0 | 4 | 8 | 12 | 21.5 | 24.5 | 35.5 | 52 |  |
|  | HD % | 0 | 27.8 | 53.3 | 64.8 | 82.6 | 86.7 | 94.3 | 97 |  |
| 10# | Time hr | 0 | 4 | 8 | 12 | 24 | 34.5 |  |  |  |
|  | HD % | 0 | 53.2 | 72 | 81.4 | 92.1 | 96.3 |  |  |  |
| 11# | Time hr | 0 | 4 | 8 | 12 | 12.5 | 24.5 | 35.5 | 50 |  |
|  | HD % | 0 | 48.2 | 71.2 | 80.4 | 81.4 | 89.8 | 94.6 | 96.6 |  |
| 12# | Time hr | 0 | 2.25 | 4 | 8 | 12 | 24 | 36 | 48.5 |  |
|  | HD % | 0 | 58.9 | 66.9 | 81.3 | 86.6 | 94.1 | 96.5 | 98.3 |  |
| 13# | Time hr | 0 | 6 | 8 | 12 | 24.5 | 30 | 51 | 72.5 |  |
|  | HD % | 0 | 39.5 | 49.9 | 61.6 | 81.3 | 85.3 | 89.4 | 93.3 |  |
| 14# | Time hr | 0 | 13 | 26 |  |  |  |  |  |  |
|  | HD % | 0 | 21 | 22 |  |  |  |  |  |  |

*No gel was observed in all examples except in example 14, wherein osmium based catalyst was used.
HD %: The percentage degree of hydrogenation of C═C content in the nitrile-butadiene rubber latex Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. A process for the hydrogenation of carbon-carbon double bonds of a polymer latex comprised of a conjugated diene and, optionally additional co-polymerizable monomer (s), comprising,
providing a polymer in latex form at a temperature of from about 35° C. to about 180° C., and a hydrogen pressure of from about 0.1 to about 20 MPa, and
adding to the polymer in latex form a catalyst having the formula:

RhQL$_x$ wherein:
Q is hydrogen or an anion;
L is a ligand compound of the formula R$_m$B, wherein R is a C$_1$-C$_8$-alkyl group, a C$_4$-C$_8$-cycloalkyl group, a C$_6$-C$_{15}$-aryl group or a C$_7$-C$_{15}$-aralkyl group, B is phosphorus, arsenic, sulfur, or a sulphoxide group and m is 2 or 3, and
x is 2, 3 or 4, and
a co-catalyst of the formula:

L wherein L is a ligand compound of the formula R$_m$B, wherein R is a C$_1$-C$_8$-alkyl group, a C$_4$-C$_8$-cycloalkyl group, a C$_6$-C$_{15}$-aryl group or a C$_7$-C$_{15}$-aralkyl group, B is phosphorus, arsenic, sulfur, or a sulphoxide group and m is 2 or 3; and
wherein the process is carried out in the absence of an organic solvent.

2. The process of claim 1 wherein the conjugated diene is selected from butadiene and isoprene.

3. The process of claim 1, wherein the optionally additional copolymerizable monomer is selected from styrene and alpha methyl styrene.

4. The process of claim 1, wherein the optionally additional copolymerizable monomer is selected from acrylonitrile and methacrylonitrile.

5. The process of claim 1, wherein the optionally additional copolymerizable monomer is acrylonitrile and an unsaturated carboxylic acid selected from fumaric acid, maleic acid, acrylic acid and methacrylic acid.

6. The process of claim 1, wherein the optionally additional copolymerizable monomer is acrylonitrile and one of propyl acrylate, butyl acrylate, propyl methacrylate and butyl methacrylate.

7. The process of claim 1, wherein the hydrogenation operation temperature is from 80 to 160° C., and the hydrogen pressure is from about 1 to 16 MPa.

8. The process of claim 1, wherein the catalyst is present at from about 0.01 to 5 weight percent, based on the weight of polymer solid content present in the latex, and the co-catalyst is present at from 0-5000 percent by weight based on the weight of the catalyst.

9. The process of claim 1, wherein x is 3, Q is a halogen.

10. The process of claim 1, wherein x is 4 and Q is hydrogen.

11. The process of claim 1, wherein the catalyst is selected from the group consisting of tris-(triphenylphosphine)-rhodium (I)-chloride, tris(triphenylphosphine)-rhodium (III)-chloride and tris-(dimethylsulphoxide)-rhodium(III)-chloride, and tetrakis-(triphenylphosphine)-rhodium hydride.

12. The process of claim 1, wherein m is 2 and B is sulphur or sulphoxide.

13. The process of claim 1, wherein m is 3 and B is phosphorus or arsenic.

* * * * *